United States Patent [19]

Miura et al.

[11] Patent Number: 4,516,554
[45] Date of Patent: May 14, 1985

[54] IGNITION TIMING CONTROL SYSTEM FOR INTERNAL COMBUSTION ENGINE

[75] Inventors: Nobuo Miura, Wako; Nolihisa Ishii, Sakado, both of Japan

[73] Assignee: Honda Giken Kogyo Kabushiki Kaisha, Tokyo, Japan

[21] Appl. No.: 480,063

[22] Filed: Mar. 29, 1983

[30] Foreign Application Priority Data

Mar. 31, 1982 [JP] Japan ................................ 57-053163
Oct. 20, 1982 [JP] Japan ................................ 57-184096

[51] Int. Cl.³ ................................................ F02P 5/04
[52] U.S. Cl. .................................... 123/418; 123/427; 123/602
[58] Field of Search ................. 123/418, 427, 602, 415

[56] References Cited

U.S. PATENT DOCUMENTS 4,292,943 10/1981 Kyogoku et al. ................ 123/418 X
4,398,516  8/1983 Momoyama ........................ 123/418
4,407,246 10/1983 Boyama ............................ 123/418 X

FOREIGN PATENT DOCUMENTS 2453701  5/1976 Fed. Rep. of Germany ...... 123/415
2491553  4/1982 France .................................. 123/418
 183567 11/1982 Japan .................................... 123/418

*Primary Examiner*—Tony M. Argenbright
*Attorney, Agent, or Firm*—Birch, Stewart, Kolasch & Birch

[57] ABSTRACT

An ignition timing control system for an internal combustion engine in which the ignition timing is kept at a retarded constant level within a lower engine speed range and a higher engine speed range and is kept at an advanced constant level within a middle engine speed range. Within transitional engine speed ranges between the lower and middle engine speed ranges and between the middle and higher engine speed ranges, the ignition timing is changed generally proportionate to and inversely proportionate to the instantaneous engine speed, respectively.

11 Claims, 22 Drawing Figures

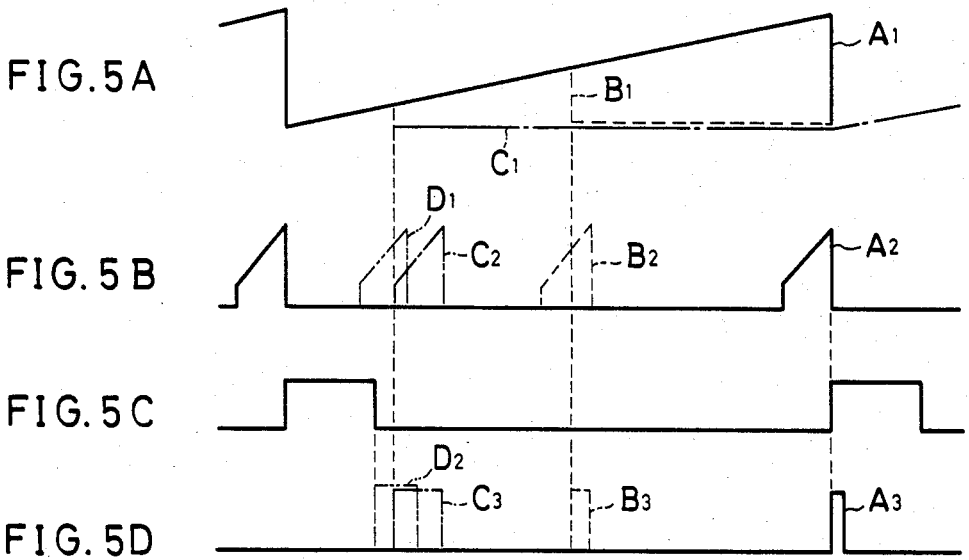

4,516,554

IGNITION TIMING CONTROL SYSTEM FOR INTERNAL COMBUSTION ENGINE

FIELD OF THE INVENTION

The present invention relates to an ignition timing control system for an internal combustion engine.

BACKGROUND OF THE INVENTION

The ignition control system for an internal combustion engine is adapted to control the ignition timing at which a high-tension voltage i.e. an ignition pulse is impressed on an ignition plug mounted on a power cylinder of the combustion engine in accordance with fluctuations of the engine speed thereby to perform preferred combution of fuel within the power cylinder.

Various ignition timing control systems have been heretofore developed. In one of such ignition control systems, the ignition timing is kept at a retarded constant level within a lower engine speed range and at an advanced constant level within a middle engine speed range. Within a transitional range between the lower and middle engine speed ranges, the ignition timing is changed generally proportionate to the fluctuations of the instantaneous engine speed.

In another ignition control system, the ignition is forced to cease within a higher speed range.

However, such ignition timing control systems as mentioned above cannot provide a pertinent or satisfactory ignition timing in some cases. In particular, the engine output power is insufficient within a higher engine speed range.

Accordingly, a primary object of the present invention is to provide a new and improved ignition timing control system which can provide a desired ignition timing for an internal combustion engine from a lower engine speed range through a middle engine speed range to a higher engine speed range.

Another object of the present invention is to provide a new an improved ignition timing control system which is reliable in operation.

A still another object of the present invention is to provide a new and improved ignition control system which can precisely control the ignition timing.

SUMMARY OF THE INVENTION

With a view to achieving the above-mentioned objects, there is provided an ignition control system which comprises an ignition control system for supplying a trigger signal to an ignition plug driving circuit which exerts a high-tension pulse to an ignition plug of an internal combustion engine, which comprises: timing pulse generating means for producing at least one timing pulse at a certain angular position of each engine cycle; and a trigger signal generating means connected to said timing pulse generating means, for producing said trigger signal at a desired ignition timing in response to said timing pulse, said trigger signal generating means keeping the ignition timing at a retarded constant level when the instantaneous engine speed is within either a lower engine speed range or a higher engine speed range and keeping at an advanced constant level when the instantaneous engine speed is within a middle engine speed range, and changing the ignition timing generally proportionate to the instantaneous engine speed within a first transitional range between the lower and the middle engine speed ranges and changing the ignition timing generally inversely proportionate to the instantaneous engine speed within a second transitional range between the middle and the higher engine speed ranges.

BRIEF DESCRIPTION OF THE DRAWINGS

The features and advantages of an ignition control system according to the present invention will be more clearly understood from the following description taken in conjunction with the accompanying drawings in which like reference numerals designate similar or corresponding components and in which:

FIGS. 5A through 5D are diagrams showing waveforms of signals appearing in the circuit arrangement so as to illustrate variations of signals according to the changes of the engine speed;

DETAILED DESCRIPTION OF PREFERRED EMBODIMENT

Figure 1:
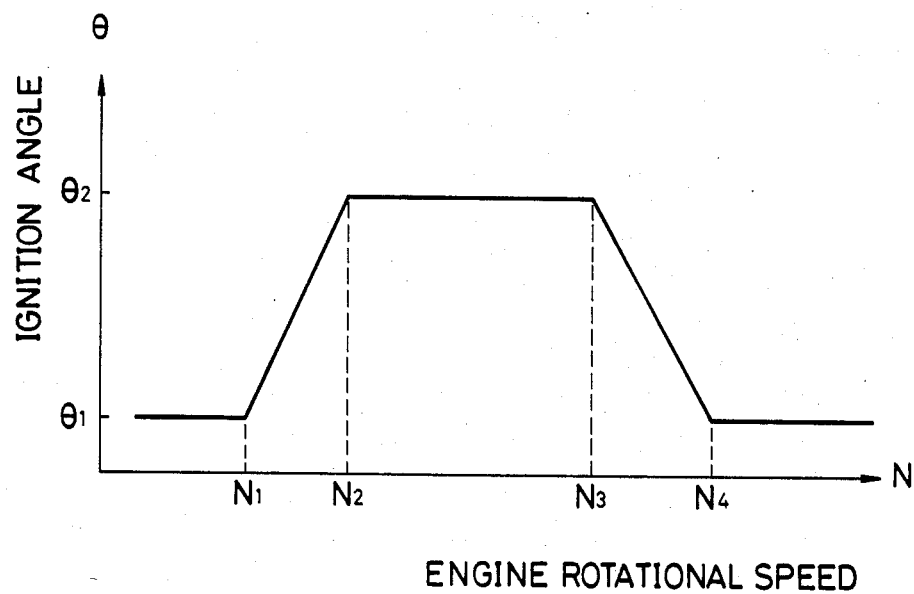
FIG. 1 is a graph showing the ignition timing in terms of the engine speed achieved by the ignition control system of FIG. 1.

Referring now to the drawings, and especially to FIG. 1, there is shown variations of the ignition timing achieved by an ignition timing control system according to the subject invention in terms of the engine rotational speed to which the ignition control system is incorporated. As seen from FIG. 1, the ignition timing is kept at a relatively retarded constant level $\theta_1$ when the instantaneous engine rotational speed takes a value within either a lower engine speed range which is lower than a predetermined value $N_1$ or a higher engine speed range which is higher than a predetermined value $N_4$. The ignition timing is kept at a relatively advanced level $\theta_2$ when the engine speed takes a value within a middle engine speed range which is from a predetermined value $N_2$ to another predetermined value $N_3$. The ignition timing is changed in either generally proportionate or porportional to the instantaneous engine speed when the instantaneous engine speed is within a transitional range from $N_1$ to $N_2$. The ignition timing is changed in either generally inversely proportionate or proportional to the instantaneous engine speed when the engine speed takes a value within another transitional range from $N_3$ to $N_4$.

Under such ignition timing control as mentioned above according to the present invention, the internal combustion engine which may be mounted on a vehicle can operate desirably.

Figure 2:
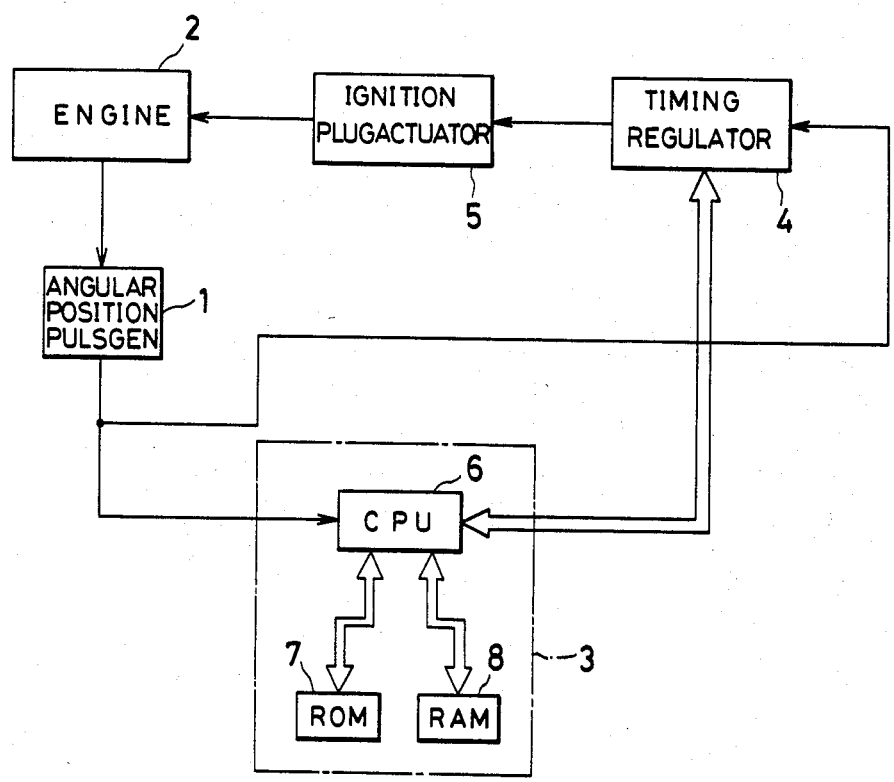
FIG. 2 is a block diagram schematically illustrating an ignition control system according to the present invention.

Referring now to FIG. 2, there is shown an ignition control system which can perform the above-mentioned ignition control. The ignition control system includes an angular position pulse generator 1 which is connected to an internal combustion engine 2 of which the ignition timing is to be controlled. The angular position pulse generator 1 consecutively produces at least one group of angular position pulses each appearing at a predetermined angular position of a crank shaft (not shown) of the engine 2 per engine cycle. The angular position pulses are supplied to a controller 3 as an information signal representative of the instantaneous engine rotational speed of the engine 2 and are further supplied to a timing regulator 4 as an information signal representing the predetermined angular position in each engine cycle. The controller 3 is, in this embodiment, comprised of a microprocessor including a typical CPU 6, ROM 7 and RAM 8. The CPU 6 receives the angular position pulses and detects the instantaneous engine rotational speed. The ROM or RAM contains a so-called data map representative of the graph of FIG. 1 and CPU 6 is operative to pick up a pertinent data from the data map in accordance with the detected instantaneous engine rotational speed. As a result, the controller 3 produces a data signal representing an ignition timing corresponding to the detected instantaneous engine rotational speed as shown in the graph of FIG. 1. The data signal is supplied to the timing regulator 4 which produces drive pulses each appearing at a timing determined on the basis of the angular position pulse in accordance with the data signal supplied from the controller 3. The drive pulses from the timing regulator 4 are consecutively supplied to an ignition plug actuator 5 which produces high-tension igniting pulses in response to the supplied drive pulses. The high-tension igniting pulses are consecutively supplied to an ignition plug (not shown) of the engine 1.

Figure 3:
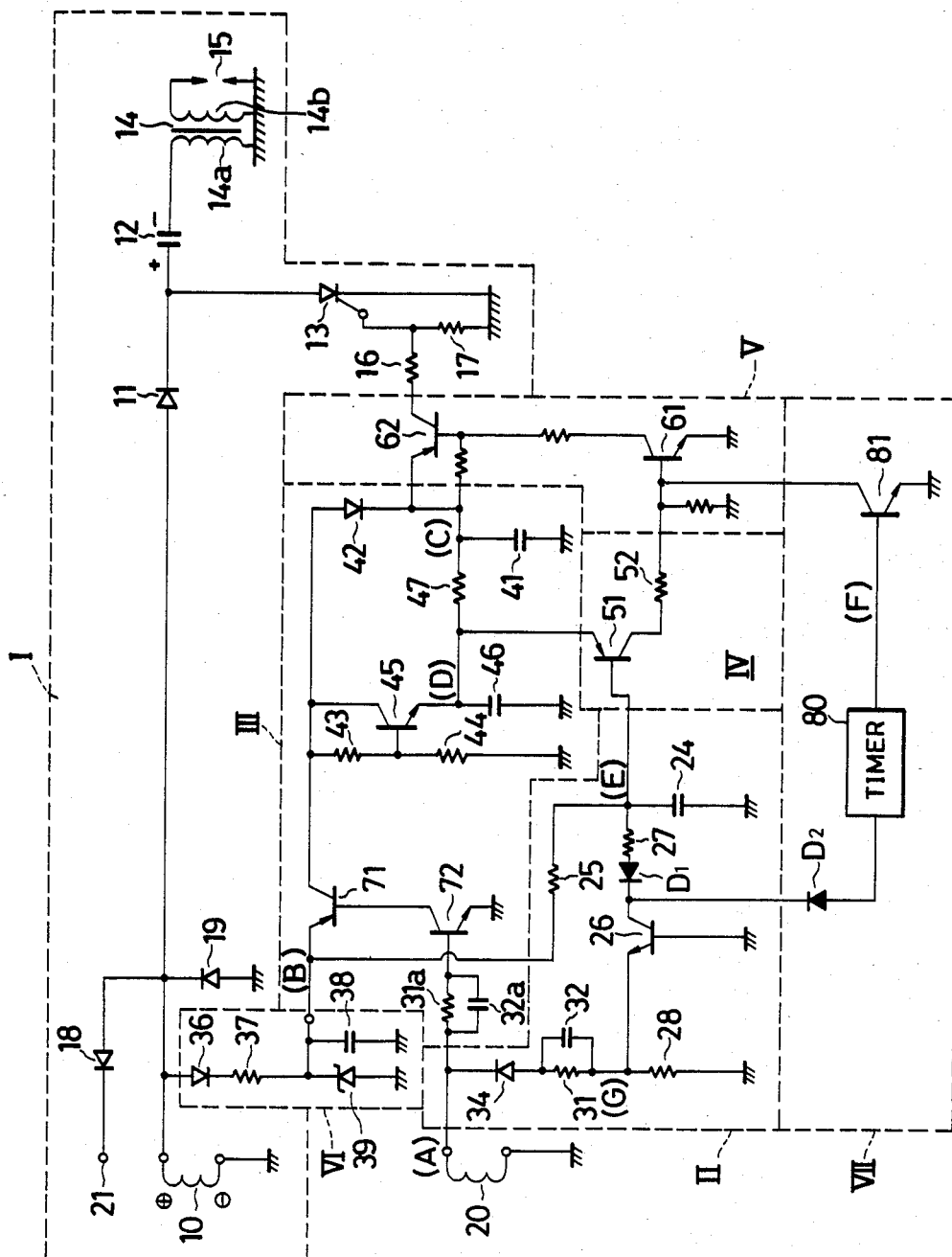
FIG. 3 is a circuit diagram showing a preferred circuit arrangement of an ignition control system according to the present invention.

Referring now to FIG. 3, there is shown a circuit arrangement which achieves such ignition timing control as shown in FIG. 1. The circuit arrangement comprises a main igniting circuit I which includes an armature coil 10 of an AC generator driven by the internal combustion engine which includes the ignition timing control of the present application. An AC voltage generated from the coil 10 is rectified by a diode 11. The rectified voltage is supplied to an ignition power supply capacitor 12 and the anode terminal of a gate controlled rectified 13 having the cathode terminal thereof grounded. When the gate controlled rectified 13 is OFF, the capacitor 12 is charged up by the rectified voltage. The charge stored in the capacitor 12 is discharged upon the conduction of the gate-controlled rectifier 13 thereby to cause a large current to abruptly flow through a primary coil 14a of an ignition coil 14. Then, a high-tension igniting voltage appears across an ignition plug 15 which is mounted within an power cylinder (not shown) of the engine. The gate-controlled rectifier 13 has the gate terminal thereof connected to a division point of a voltage divider made of resistors 16 and 17 whereby the rectifier 13 is triggered to be conductive by a trigger pulse applied through the voltage divider. A diode 18 is provided for producing a DC voltage which is supplied through an power source terminal 21 to other circuits (not shown). A diode 19 is further provided for protecting the diode 11 or rectifier 13 from the reverse voltage appearing across the coil 10.

A pulser coil 20 is provided which functions as the angular position pulse generator 1 shown in the system of FIG. 2. The pulser coil 20 placed within a magnetic field produced by a magnet (not shown) rotatable with the engine crank shaft of the engine. The magnetic field varies in strength in concurrence with the engine operation, so that the pulser coil produces positive (first) and negative (second) timing pulses respectively appearing at predetermined angular positions per engine cycle, for example, the most advanced firing angle and most retarded firing angle in the engine cycle.

The trigger pulse signal to be supplied to the rectifier 13 is produced by various circuit II, III, IV, V, VI and VII.

The circuit II is a saw-tooth wave generator which produces a first saw-tooth wave signal appearing in synchronism with the second timing pulses and having each apex thereof at each of the second timing pulses and each steep portion thereof lasting between the successive two of the second timing pulses.

The circuit III is another saw-tooth wave generator which produces a second saw-tooth wave signal appearing between the successive first and second timing pulses. More specifically, the second saw-tooth wave signal abruptly rises up to a certain level at the occurrence of each of the first timing pulses and gradually increases in level at a steepness greater than that of the steep portion of the first saw-tooth wave signal until it falls down in level at the occurrence of each of the second timing pulses.

The circuit IV is a comparing circuit for comparing in level the first and second saw-tooth wave signals and for producing an ON signal until the second timing pulse when difference in level between the first and second saw-tooth wave signals reaches a predetermined value, for example, zero. The circuit V is a trigger signal generator for producing a trigger signal in response to the ON signal from the comparing circuit IV which is supplied to the gate terminal of the rectifier 13 by way of the voltage divider 16, 17. The circuit VI is a power supply circuit for supplying a constant DC voltage to the first and second saw-tooth wave signal generators II and III. The power supply circuit VI includes a diode 36 which rectifies the AC output voltage from the armature coil 10. The rectified voltage is exerted onto a storing capacitor 38 while the rectified voltage is regulated at a constant DC voltage by means of a zener diode 39 which is connected in parallel with the capacitor 38.

The first saw-tooth wave generator II includes a capacitor 24 which is charged by the constant DC voltage from the power supply circuit VI through a resistor 25. On the other hand, a transistor 26 has the collector thereof connected to a junction between the resistor 25 and one terminal of the capacitor 24 by way of a series connection of a diode $D_1$ and a resistor 27. The base of the transistor 26 is grounded. The emitter of the transistor 26 is connected to an intermediate junction between resistors 28 and 31 which are serially connected to each other. The resistor 31 is bypassed by a speed up capacitor 32. The series connection of resistors 28, 31 is connected in parallel with the pulser coil 20 by way of a diode 34, so that, the second timing pulses are relayed to the emitter of the transistor 26 which is in turn made conductive in response thereto for discharging the storing capacitor 24 whereby the first saw-tooth wave signal appears at point E, that is, across the capacitor 24.

The second saw-tooth wave generator III includes a switch transistor 71 which is made conductive when a transistor 72 is conductive in response to the first (positive) pulse from the pulser coil 20 through a parallel connection of a resistor 31a and a speed-up capacitor 32a. When the switch transistor 71 is made conductive, a storing capacitor 41 is charged by way of a diode 42. At the same time, a capacitor 46 is charged up to a lower voltage which is determined by a voltage divider of resistors 43, 44 and a transistor 45. The storing capacitors 41 and 46 are connected with each other by way of a resistor 47 so that the capacitor 46 is charged at a time constant determined by its own capacitance and the resistance of the resistor 47 by a voltage appearing across the storing capacitor 41 whereby the second saw-tooth wave signal appears at a point D.

The comparing circuit 51 includes a transistor 51 having the emitter thereof connected to one terminal of the capacitor 46 so as to receive the second saw-tooth wave signal and the base thereof connected to the point E of the first saw-tooth wave signal generator II. The collector of the transistor 51 is connected via a resistor 52 to an input terminal of the trigger signal generator V. The trigger signal generator V includes a control transistor 61 having the base thereof connected to the output terminal of the comparing circuit IV and the emitter thereof grounded so that the control transistor 61 is made conductive by the ON signal via the resistor 52 of the comparing circuit IV. Upon the conduction of the control transistor 61, a power transistor 62 becomes conductive so that the trigger signal is supplied through the resistor 16 to the gate terminal of the gate-controlled rectifier 13.

The circuit VII is an inhibiting circuit which includes a timer circuit 80. The timer circuit 80 is triggered by each of the second (negative) timing pulses to start production of a timer pulse lasting during a predetermined time period. The predetermined time period is so selected that the timer pulse disappears at latest until the succeeding negative timing pulse.

Referring now to FIGS. 4A through 4F, the operation of the circuit arragement of FIG. 3 will be explained hereinbelow in more detail.

Figure 4A:
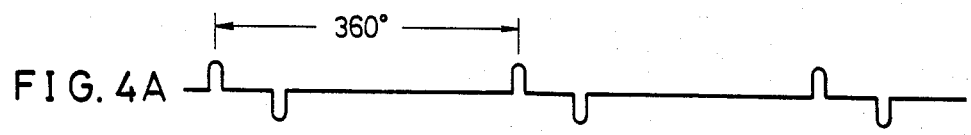
FIGS. 4A through 4F are diagrams showing waveforms of various signals appearing in the circuit arrangement of FIG. 3.
Figure 4B:
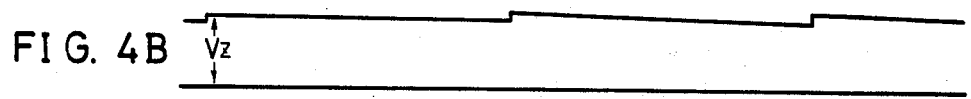
Figure 4C:
Figure 4D:
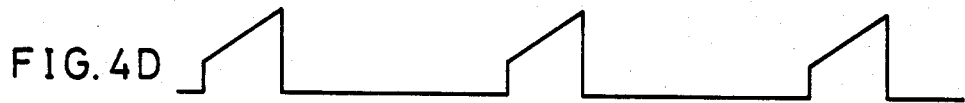
Figure 4E:
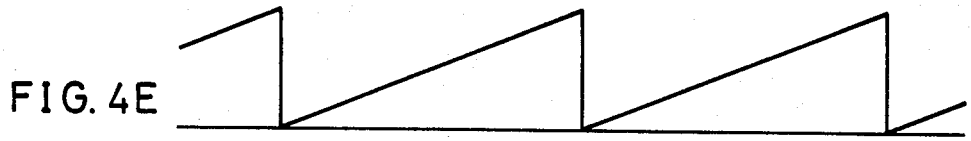
Figure 4F:

When, at first, the engine starts, the pulser coil 20 produces the first (positive) and second (negative) timing pulses having such waveforms as shown in FIG. 4A. The first and second timing pulses preferably appear at most advanced firing angular position and most retarded firing angular position, respectively, so that the first and second timing pulses define an allowable variable range for the ignition timing (firing angle) at each engine cycle. On the other hand, the armature coil 10 produces the AC voltage which is rectified and supplied to the parallel connection of the zenor diode 39 and the capacitor 38 of the power supply circuit VI whereby a constant voltage of $V_z$ having such a waveform as shown in FIG. 4B appears across the capacitor 38. The first timing pulse from the pulser coil 20 is supplied through the parallel connection of the resistor 31a and the capacitor 32a to the base of the transistor 72 which is in turn made conductive so that the transistor 71 becomes conductive. Due to the conduction of the transistor 71, the constant voltage from the power source circuit VI is supplied across the capacitor 41 so that the voltage across the capacitor 41 rises until conduction of the transistor 71 cease whereby the voltage across the capacitor 41 varies in such a manner as shown in FIG. 4C. At the same time, the transistor 45 becomes conductive so as to make the capacitor 46 charged. It is, in this instance, to be noted that the charging voltage impressed on the capacitor 46 is lower than that of the capacitor 41. Accordingly, the charge stored in the capacitor 41 moves via the resistor 47 to the capacitor 46 so that the voltage across the capacitor 47 to the capacitor 46 so that the voltage across the capacitor 46 varies as the second saw-tooth wave signal having such a waveform as shown in FIG. 4D.

The transistor 26 of the first saw-tooth wave generator II is made conductive by the second (negative) timing pulse thereby to discharge the capacitor 24 and at the same time to make the transistor 51 conductive whereby the capacitors 41 and 46 are discharged. Since the constant voltage from the circuit VI is constantly impressed through a resistor 25 on the capacitor 24, the capacitor 24 is charged again so that the voltage across the capacitor 24 rises gradually thereby to produce the first saw-tooth wave signal having such a waveform as shwon in FIG. 4E.

On the other hand, the timer circuit 80 produces trigger inhibiting pulses each lasting during a predetermined time period from each negative timing pulse, the trigger inhibiting pulses being supplied to the base of the transistor 81.

The transistor 51 of the comparing circuit IV becomes conductive when the second saw-tooth voltage appearing across the capacitor 46 exceeds the first saw-tooth wave voltage across the capacitor 24. Conduction of the transistor 51 causes the conduction of the transistors 61 and 62 whereby the trigger pulse is supplied to the gate of the gate-controlled rectifier 13 and the capacitor 12 is discharged to cause the high-tension igniting voltage to be exerted on the plug 15. It is now apparent that the ignition timing is determined when the difference between the first and second saw-toothe wave voltages reaches a predetermined value, for example, zero (or the base-emitter voltage in this embodiment). It is now to be understood that the second saw-tooth wave signal (FIG. 4D) has a larger steepness than that of the first saw-tooth wave signal (FIG. 4E) so that the higher the engine rotational speed increases within the transitional range from $N_1$ to $N_2$, the earlier the second saw-tooth wave voltage reaches the first saw-tooth wave voltage thereby causing the ignition timing to advance. Since, however, each of the second saw-tooth wave pulse has the leading edge of a certain voltage, the second saw-tooth wave pulses exceeds the first saw-tooth wave pulse immediately upon appearance of the negative timing pulse when the instantaneous engine rotational speed is higher than $N_2$, whereby the trigger signal from the circuit V appears at the appearance of the negative timing pulse when is the most advanced ignition timing. This situation continues until the instantaneous engine rotational speed reaches the value $N_3$. When the instantaneous engine rotational speed takes a value above the value $N_3$, the second saw-tooth wave voltage exceeds the first saw-tooth voltage so as to cause the transistor 51 to be conductive while the transistor 81 is still conductive, whereby the transistor 61 is not made conductive even upon the conduction of the transistor 51. Upon the decay of the trigger inhibiting pulse, the transistor 61 becomes conductive so that the gate-controlled rectifier 13 is triggered. With the above-mentioned manner, the ignition timing is retarded generally proportionate to the instantaneous engine rotational speed until the instantaneous engine rotational speed exceeds the value $N_4$. Since, however, the trigger inhibiting pulse from the timer circuit 80 cannot last even after appearance of the succeeding negative pulse, the ignition timing is kept at the most retarded angular position at which the negative timing pulse appears when the instantaneous engine speed exceeds the value $N_4$.

Referring now to FIGS. 5A through 5D, there are shown waveforms of the first and second saw-tooth wave voltages, trigger inhibiting pulse and trigger pulses, respectively. In FIGS. 5A, 5B and 5D, solid lines, A1, A2 and A3 illustrates waveforms of the first saw-tooth wave voltage, the second saw-tooth wave voltage and the trigger pulse when the instantaneous engine speed is lower than the value $N_1$. The broken lines B1, B2 and B3 illustrate those waveforms when the engine speed takes a value within the transitional range from $N_1$ to $N_2$. Phantom lines C1, C2 and C3 illustrate those waveforms when the engine speed is within the range $N_2$ to $N_3$. Other phantom lines D1 and D2 illustrate the second saw-tooth wave voltage and the trigger pulse when the engine speed is within the range $N_3$ to $N_4$.

It is now to be noted that the timer circuit 80 may include a capacitor charge-discharge circuit, if preferred.

Figure 6:
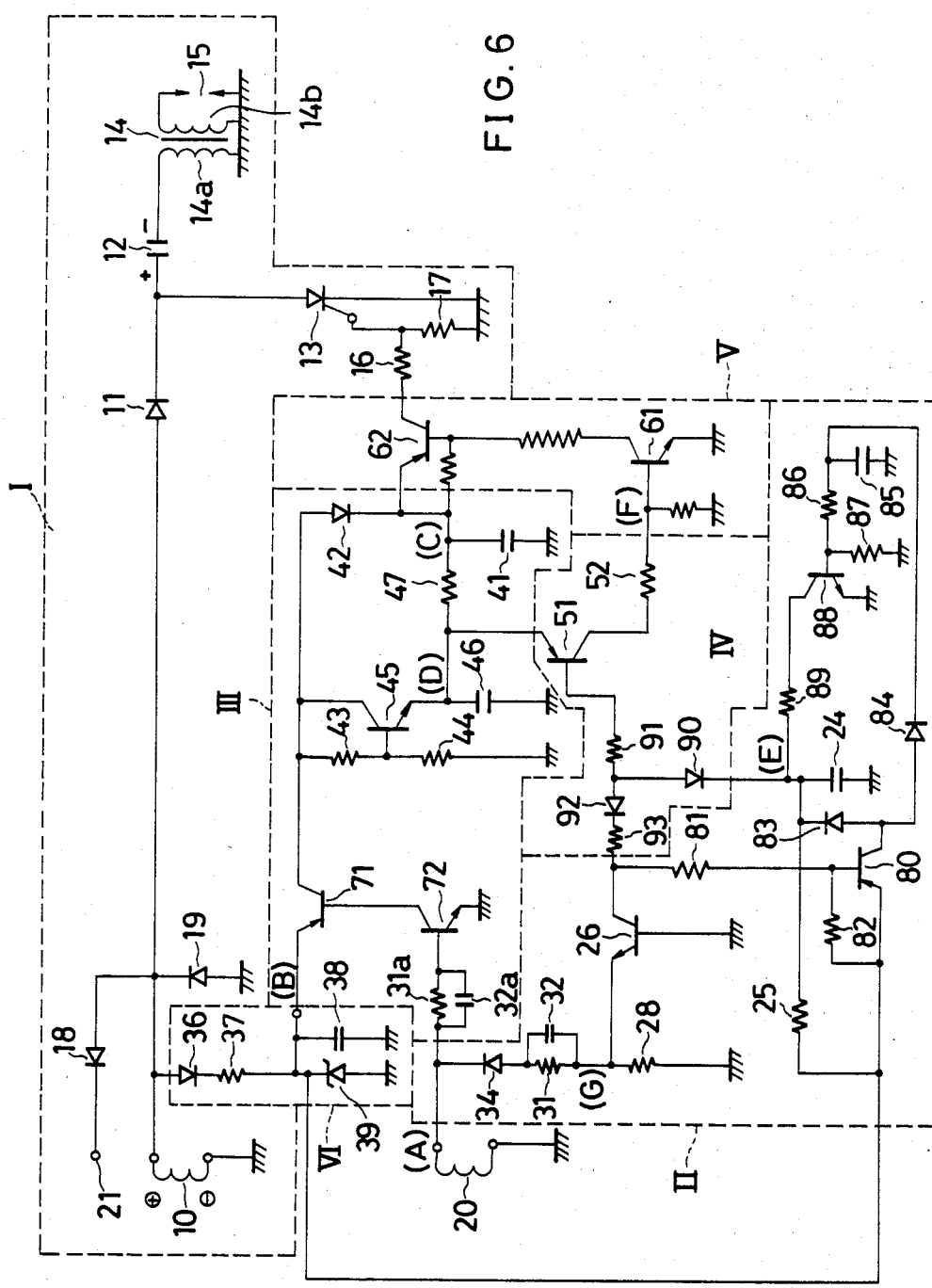
FIG. 6 is a circuit diagram showing another circuit arrangement of an ignition control system according to the present invention.

Referring now to FIG. 6, there is shown another circuit arrangement of the ignition control system according to the present invention, which is the same as that of FIG. 3 except for the first saw-tooth wave generator II and the comparing circuit IV. The first saw-tooth wave generator II includes a first charging capacitor 24 which is constantly charged by the constant voltage from the power source circuit VI by way of a first charging circuit including a resistor 25. A second charging circuit is provided for abruptly charging the first capacitor in response to the second timing pulse. The second charging circuit includes a transistor 80, a resistor 82 bridging between the emitter and the base of the transistor 80 to provide sufficient current to the collector of a transistor 26 through a resistor 81. The charging current is supplied through a diode 83 to the capacitor 24. The transistor 80 is made conductive due to the conduction of the transistor 26 which is triggered by the second timing pulse via the series circuit of resistors 28 and 31, diode 34 and a capacitor 32. The first saw-tooth wave generator II further includes a discharging circuit for slowly discharging the first capacitor 24 at a certain time constant from the appearance of each of the second timing pulses. The discharging circuit includes a second capacitor 85 which is charged by way of the transistor 80 and a diode 84 by the second timing pulse. The capacitor 85 is then discharged through resistors 86 and 87, and the emitter and base of a transistor 88 which is in turn made conductive. Due to the conduction of the transistor 88, the capacitor 24 is discharged therethrough via a resistor 89. The resistors 86, 87 and 89, and the transistor 88 constitute a current-drive switch circuit connected in parallel with the first capacitor and becomes conductive to discharge the first capacitor while it is driven by a current flowing from the second capacitor 85 which is in turn discharged.

The comparing circuit IV includes a transistor 51 having the emitter thereof connected to the capacitor 46 of the first saw-tooth wave generator. The base of the transistor 51 is connected through a resistor 91, a diode 92 and a resistor 93 to the emitter of the transistor 26 and is further connected through the resistor 91 and a diode 90 to the capacitor 24. The collector of the transistor 51 is connected through a resistor 52 to the input of the trigger pulse generator V.

Figure 7A:
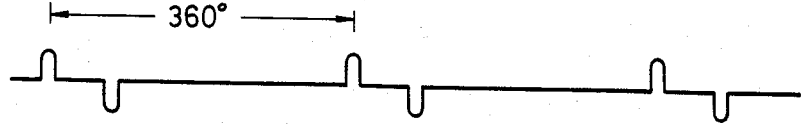
FIG. 7A through 7F are diagrams showing waveforms of signals appearing in the circuit diagram of FIG. 6.
Figure 7B:
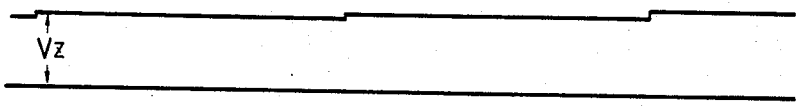
Figure 7C:
Figure 7D:

When, with the above-mentioned arrangement, the engine starts, the pulser coil 20 produces the first (positive) and second (negative) timing pulses having such waveforms as shown in FIG. 7A. The first and second timing pulses appears at the most advanced and retarded angular positions, respectively. The power supply circuit VI produces a constant voltage $V_z$ having such a waveform as shown in FIG. 7B. The voltage across the capacitor 41 varies in such a manner as shown in FIG. 7C and the voltage across the capacitor 46 varies in such a manner as shown in FIG. 7D to produce the second saw-tooth wave signal.

The above-mentioned operations in the circuit III and VI are the same as those circuits III and VI in the circuit arrangement of FIG. 3.

Figure 7E:
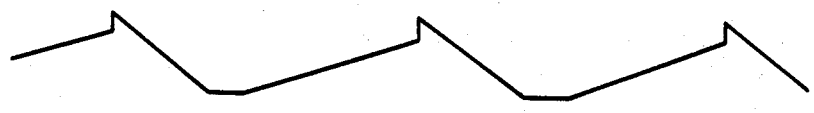
Figure 7F:
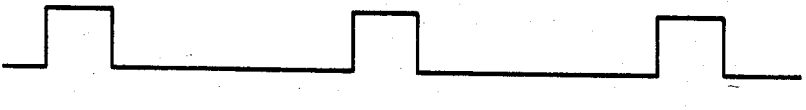

On the other hand, the capacitor 24 of the circuit II is constantly slowly charged by the constant voltage from the power source circuit VI until the appearance of each of the second timing pulses. Upon appearance of each of the second timing pulses, the capacitor 24 is abruptly charged through the transistor 80 and the diode 83 and then gradually discharged in concurrence with the discharge of the capacitor 85 through the transistor 88, with the result that the voltage across the capacitor 24 changes in such a manner as shown in FIG. 7E to produce a first saw-tooth wave signal having each apex there of each of the second timing pulses and having two steep portions one of which gradually decreases in level from one of the apexes thereof until an intermediate angular position and the other of which gradually increases in level from the particular intermediate angular position until the succeeding one of the apexes thereof. The first saw-tooth wave signal is similar to a triangular wave signal. The steepness of the first saw-tooth wave signal is smaller than that of the second saw-tooth wave signal. The transistor 51 is made conductive when the second saw-tooth wave signal (FIG. 7D) exceeds in level the first saw-tooth wave signal (FIG. 7E) so that the comparing circuit IV produces through a resistor 52 a voltage having such a waveform as shown in FIG. 7F.

Figure 8:
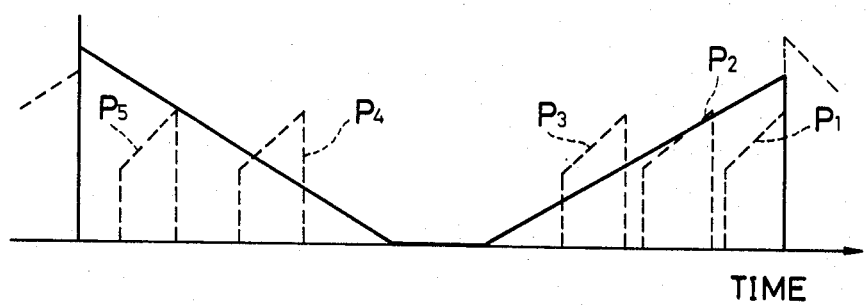
FIG. 8 is a diagram showing variations of signals appearing in the circuit arrangement of FIG. 6 according to changes of the engine speed.

Referring now to FIG. 8 there is shown a portion of the first saw-tooth wave signal generated between two successive second timing pulses in the circuit arrangement of FIG. 6 by solid lines in comparison with the second saw-tooth wave signal illustrated by broken lines P1 through P5. The illustrated first saw-tooth wave signal corresponds to a situation in which the engine rotational speed takes a value within a range lower than $N_1$. The angular position of the second saw-tooth wave voltage moves leftwardly of FIG. 8 with respect to the first saw-tooth wave signal, i.e., from P1 toward P5 in concurrence with the increase of the engine speed. More specifically, the second saw-tooth wave pulse appears at the position P1 when the engine speed is lower than the value $N_1$, so that the second saw-tooth wave pulse cannot exceeds in level the first saw-tooth wave voltage whereby the ignition timing coincides with the appearance instance of each of the second timing pulse, that is, the most retarded firing angular position. When the engine speed further increases above the value $N_1$, the second saw-tooth wave appears at an earlier position $P_2$ so that the second saw-tooth wave voltage exceeds in level the first saw-tooth wave voltage at an advanced angular position varying generally proportionate to the engine speed.

When the engine speed further increases above a value $N_2$, the second saw-tooth wave pulse appears at a further earlier position $P_3$. However, the second saw-tooth wave voltage has the leading edge of a certain voltage so that the second saw-tooth voltage exceeds in level the first saw-tooth voltage immediately after the appearance of the first timing pulse whereby the ignition takes place upon the appearance of the first timing pulse which is the most advanced angular position. This situation continues as long as the engine speed takes a value within a range from $N_2$ to $N_3$.

When the engine speed further increases above the value $N_3$, the second saw-tooth wave pulse appears at a still further earlier position $P_4$. Under this condition, the timing at which the second saw-tooth wave voltage exceeds the first saw-tooth wave voltage retards in reversely proportionate to the increase of the engine rotational speed.

When the engine speed further increases above the value $N_4$, the second saw-tooth wave pulse appears at a still further earlier position $P_5$. Under this condition, the second saw-tooth wave voltage never exceed in level the first saw-tooth wave voltage, so that the ignition takes place at the appearance of each the second timing pulses, that is, the most retarded angular position.

Figure 9:
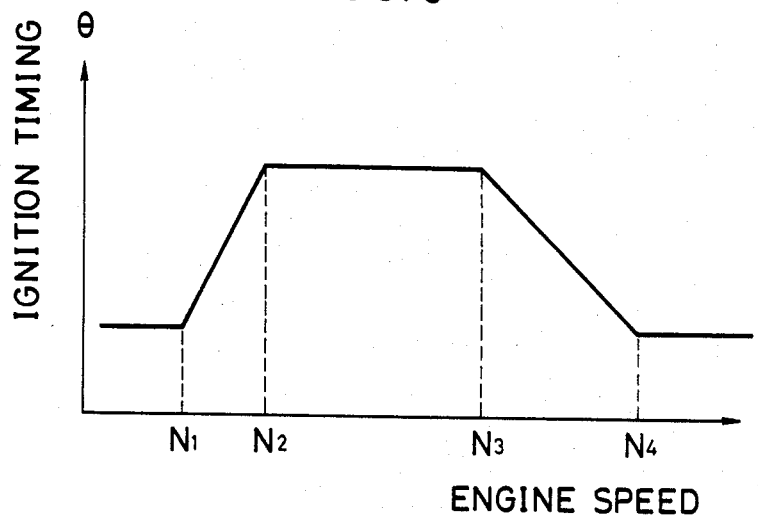
FIG. 9 is a graph showing the ignition timing in terms of the engine speed achieved by the ignition control system of FIG. 6.

The above-mentioned variations in the ignition timing in terms of the variations of the engine rotational speed are illustrated in FIG. 9. As seen from the graph of FIG. 9, the ignition timing changes within a transitional range from $N_1$ to $N_2$ at a rate higher than within another transitional range from $N_3$ to $N_4$.

Furthermore, it is to be understood that the circuit arrangement can more stably operate than that of FIG. 3 since the second first saw-tooth wave signal has such a triangular waveform as mentioned above, typically seen in FIG. 7E.

It will be understood that the invention is not to be limited to the exact construction shown and described and that various changes and modifications may be made without departing from the spirit and scope of the invention, as defined in the appended claims.

What is claimed is:

1. An ignition control system for supplying a trigger signal to an ignition plug driving circuit which exerts a high-tension pulse to an ignition plug of an internal combustion engine, which comprises:
    timing pulse generating means for producing first and second timing pulses at the positions of greatest ignition advancement and retardation of each engine cycle, respectively, per engine cycle; and
    trigger signal generating means connected to said timing pulse generating means, for producing said trigger signal at a desired ignition timing in response to said timing pulses, said trigger signal generating means keeping the ignition timing at a retarded constant level when the instantaneous engine speed is within either a lower engine speed range or a higher engine speed range and keeping the ignition timing at an advanced constant level when the instantaneous engine speed is within a middle engine speed range, and changing the ignition timing generally proportionate to the instantaneous engine speed within a first transitional range between the lower and the middle engine speed ranges and changing the ignition timing generally inversely proportionate to the instantaneous engine speed within a second transitional range between the middle and the higher engine speed ranges, said trigger signal generating means including,
    first saw-tooth wave generating means for generating a first saw-tooth wave signal having each apex thereof coincident to each of said second timing pulses and having each sloped portion thereof lasting between the successive two of said second timing pulses,
    second saw-tooth wave generating means for generating a second saw-tooth wave signal abruptly rising up to a certain level at the occurrence of each of said first timing pulses and gradually increasing in level at a steepness greater than that of the sloped portion of said first saw-tooth wave signal and dropping down in level coincident to the occurrence of each of said second timing pulses,
    comparing means for comparing in level said first and second saw-tooth wave signals and for producing an ON signal when the difference in level between said first and second saw-tooth wave signals reaches a predetermined value,
    trigger signal generating means for generating said trigger signal in response to said ON signal, and
    inhibiting circuit means for inhibiting said ON signal from being supplied to said trigger signal generating circuit during a predetermined time period beginning after the occurrence of said second timing pulse.

2. An ignition control system according to claim 1, in which said trigger signal generating means changes the ignition timing within said first transitional range at a higher rate than within said second transitional range.

3. An ignition system according to claim 1, in which said timing pulse generating means includes a pulser coil for producing across the terminals thereof said first and second timing pulses in response to variations in magnitude of a magnetic field interlinked therewith, and a rotational body rotating in synchronism with the engine cycle so as to abruptly vary said magnetic field at the most advanced angular position and at the most retarded angular position per each engine cycle.

4. An ignition control system according to claim 3, in which said first saw-tooth wave generating means includes:
    voltage source means for producing a constant voltage;
    a first capacitor;
    charging circuit means for constantly charging said first capacitor with said constant voltage from said voltage source means; and
    discharging circuit means connected to said capacitor and said pulser coil, for discharging said capacitor in response to each of said second timing pulses, thereby to produce said first saw-tooth wave signal across the terminals of said capacitor.

5. An ignition control system according to claim 4, in which said second saw-tooth wave generating means includes:
    first switch circuit means connected to said voltage source, for passing therethrough said constant voltage during the appearance of each of said first timing pulses;
    a second capacitor which is directly charged by the constant voltage passed through said first switch circuit means;
    a third capacitor;

voltage reducing circuit means for reducing said constant voltage and applying the reduced constant voltage to said third capacitor; and
a resistor interconnecting said second and third capacitors, whereby said second saw-tooth wave signal appears across said third capacitor.

6. An ignition control system according to claim 5, in which said comparing means includes:
a PNP transistor having the emitter thereof connected to said third capacitor and the base thereof connected to said first capacitor, thereby to produce said ON signal on the collector thereof when the voltage across said third capacitor exceeds that of said first capacitor, thereby to produce said ON signal.

7. An ignition control system according to claim 6, in which said trigger signal generating means includes:
second switch circuit means for passing therethrough said constant voltage passed through said first switch circuit means to said ignition circuit in response to said ON signal.

8. An ignition control system according to claim 7, in which said inhibiting circuit means includes:
timer means for producing an inhibiting pulse lasting during a predetermined time period from each of said second timing pulses; and
gate circuit means for blocking said ON signal during the presence of said inhibiting pulse from said second switch circuit means.

9. An ignition control system for supplying a trigger signal to an ignition plug driving circuit which exerts a high-tension pulse to an ignition plug of an internal combustion engine, which comprises:
timing pulse generating means for producing first and second timing pulses at the positions of greatest ignition advancement and retardation of each engine cycle, respectively, per engine cycle; and
trigger signal generating means connected to said timing pulse generating means, for producing said trigger signal at a desired ignition timing in response to said timing pulses, said trigger signal generating means keeping the ignition timing at a retarded constant level when the instantaneous engine speed is within either a lower engine speed range or a higher engine speed range and keeping the ignition timing at an advanced constant level when the instantaneous engine speed is within a middle engine speed range, and changing the ignition timing generally proportionate to the instantaneous engine speed within a first transitional range between the lower and the middle engine speed ranges and changing the ignition timing generally inversely proportionate to the instantaneous engine speed within a second transitional range between the middle and the higher engine speed ranges, said trigger signal generating means including,
first saw-tooth wave generating means for generating a first saw-tooth wave signal having each apex thereof coincident to each of said second timing pulses and having two sloped portions, one of which gradually decreases in level from one of the apexes thereof until an intermediate angular position and the other of which gradually increases in level from the intermediate angular position until the succeeding one of the apexes thereof;
a second saw-tooth wave generating means for generating a second saw-tooth wave signal abruptly rising up to a certain level at the occurrence of each of said first timing pulses and gradually increasing in level at a steepness greater than that of the sloped portions of said first saw-tooth wave signal and dropping down in level coincident to the occurrence of each of said second timing pulses; and
comparing means for comparing in level said first and second saw-tooth wave signals and for producing an ON signal when the difference in level between said first and second saw-tooth wave signal reaches a predetermined value.

10. An ignition control system according to claim 9, in which said first saw-tooth wave generating means includes:
voltage source means for producing a constant voltage;
a first capacitor;
first charging circuit means for constantly and slowly charging said first capacitor with said constant voltage via a resistance;
second charging circuit means for abruptly charging said first capacitor in response to each of said second timing pulses;
discharging circuit means for slowly discharging said first capacitor at a time constant from the appearance of each of said second timing pulses.

11. An ignition control system according to claim 10, in which said discharging circuit means includes:
a second capacitor;
second capacitor charging circuit means for charging said second capacitor with said constant voltage in response to each of said second timing pulses; and
current-drive switch connected in parallel with said first capacitor and being conductive to discharge said first capacitor while it is driven by a current flowing from said second capacitor which is in turn discharged.

* * * * *